United States Patent [19]
Krum et al.

[11] Patent Number: 5,482,381
[45] Date of Patent: Jan. 9, 1996

[54] ACTUATOR ASSEMBLY HAVING LABYRINTH SEAL

[75] Inventors: Richard G. Krum, Thousand Oaks; Eldon L. Nelson, Simi Valley; Khosrow Mohajerani; Michael B. Moir, both of Newbury Park, all of Calif.

[73] Assignee: Seagate Technology, Inc., Scotts Valley, Calif.

[21] Appl. No.: 260,519

[22] Filed: Jun. 16, 1994

[51] Int. Cl.$^6$ .............................. F16C 33/80; G11B 5/55
[52] U.S. Cl. ............................................ 384/480; 360/106
[58] Field of Search ....................... 384/130, 144, 384/480, 488; 360/106

[56] References Cited

U.S. PATENT DOCUMENTS

| | | | |
|---|---|---|---|
| 4,117,750 | 10/1978 | Kopelev et al. | 384/480 X |
| 4,810,108 | 3/1989 | Yajima | 384/488 |
| 4,893,206 | 1/1990 | Shtipelman et al. | 360/106 |
| 5,161,077 | 11/1992 | Jabbari | 360/106 |
| 5,315,465 | 5/1994 | Blanks | 360/106 |

Primary Examiner—Thomas R. Hannon
Attorney, Agent, or Firm—Kelly, Bauersfeld & Lowry

[57] ABSTRACT

An actuator assembly for a computer disk drive includes a pivot shaft which defines a pivot axis for the actuator assembly, a pivotable actuator which encircles the pivot shaft, a bearing assembly disposed between the pivot shaft and the actuator, and a labyrinth seal adjacent to a lower edge of the bearing assembly. The labyrinth seal is incorporated into the pivot shaft and includes an axially extending ridge which is disposed in facing relation to a lower edge of the bearing assembly. The labyrinth seal also includes a reservoir disposed radially inwardly of the axially extending ridge, and a flange which extends radially outwardly of the axially extending ridge. The flange includes both axially and radially-facing surfaces which are disposed in facing relation to oppositely facing surfaces of the actuator. Very small air gaps are maintained between the labyrinth seal and the actuator assembly, on the order of 0.003 to 0.005 inch, in order to eliminate or minimize any actuator bearing lubricant migration or out-gassing into the disk drive assembly. An actuator shaft washer seal is provided adjacent to the upper edge of the bearing assembly. The actuator shaft washer seal is fixed to the actuator and extends radially inwardly toward the pivot shaft.

17 Claims, 1 Drawing Sheet

ACTUATOR ASSEMBLY HAVING LABYRINTH SEAL

BACKGROUND OF THE INVENTION

This invention relates generally to improvements in actuator assemblies for use in computer disk drives. More particularly, the present invention relates to an improved actuator assembly having a labyrinth seal capable of eliminating or minimizing actuator bearing lubricant migration or out-gassing into the computer disk drive.

In recent years, microcomputer equipment, particularly the so-called personal and desk top computers, having become extremely popular for a wide variety of business, educational and other uses. Such computers commonly include a main central processor unit having one or more memory storage disks for storage of data. In many modern computers the storage disk or disks, sometimes referred to as "hard disks", are provided as part of a Winchester-type disk drive unit having the storage disks supported in a stack on a rotary spindle within a substantially sealed disk drive housing. The disks are rotatably driven in unison by a small spindle motor, and one or more electromagnetic heads on a movable actuator are displaced by a moving coil, limited rotation D.C. motor to traverse surfaces of the rotating disks for purposes of reading and writing data. Such Winchester-type disk drive units are generally preferred in comparison with so-called floppy-type disk drives due to their higher memory storage capacities and faster operating speeds.

The actuator used in Winchester-type disk drive units resembles the traversing arm of a common phonograph, and typically includes an arm assembly designed to carry the electromagnetic heads which are used to read and write data on the disk stack. A coil is mounted to the actuator opposite to the arm assembly to interact with a magnet assembly for purposes of controlling the movement and positioning of the electromagnetic heads. As current moves through the coil, it reacts with the magnet assembly to move the entire actuator assembly.

The actuator is typically mounted for pivotal movement about a pivot shaft which is fixed relative to a housing for the computer disk drive. A bearing assembly, usually comprising one or more bearings, is disposed between the pivot shaft and the actuator. The bearings must be lubricated to ensure their proper operation, but it is important that the bearing lubricant not be permitted to migrate from the bearing assembly into contact with other components of the computer disk drive since this could cause a malfunction. For this reason, double-shielded bearings are often used in order to minimize actuator bearing lubricant migration. It has been found, however, that this alone is not enough to prevent the undesirable migration of the bearing lubrication, particularly due to the high centrifugal forces to which the actuator and bearing components are subjected during normal operation of the disk drive unit.

Accordingly, there has been a need for an improved actuator assembly construction which is capable of more efficiently eliminating or minimizing any actuator bearing lubricant migration or out-gassing into the hard disk drive unit. Such an improved actuator assembly should be capable of being efficiently and economically incorporated into most standard-design hard disk drive assemblies, and minimize any additional manufacturing steps for the actuator assembly in comparison with similar actuator assemblies without the improvement. Preferably, a seal is needed which does not interfere with pivotal movement of the actuator about the pivot shaft, and yet reduces the amount of air flow and blocks the travel of small particles between high and low pressure areas through the actuator assembly, and particularly the bearing assembly thereof. The present invention fulfills these needs and provides other related advantages.

SUMMARY OF THE INVENTION

The present invention resides in an improved actuator assembly for a computer disk drive system, which is designed to eliminate or minimize actuator bearing lubricant migration or out-gassing into the disk drive assembly. The actuator assembly comprises, generally, a pivot shaft which defines a pivot axis for the actuator assembly, an actuator which is pivotable about the pivot axis, a bearing assembly disposed between the pivot shaft and the actuator, and a labyrinth seal disposed adjacent to an edge of the bearing assembly.

In a preferred form of the invention, the pivot shaft is fixed relative to a housing for the computer disk drive. The actuator generally encircles at least a portion of the pivot shaft, and includes an arm assembly which extends toward a stack of data storage disks. The bearing assembly includes upper and lower shielded bearings which define, respectively, upper and lower edges of the bearing assembly. Each of the bearings includes an inner race fixed to the pivot shaft, and an outer race fixed to the actuator.

The labyrinth seal is incorporated into the pivot shaft and is disposed adjacent to the lower edge of the lower shielded bearing. The labyrinth seal includes an axially extending ridge which is disposed in facing relation to an edge of the outer race of the lower bearing, and separated therefrom by an air gap of between 0.003 and 0.005 inch. A reservoir is disposed radially inwardly of the axially extending ridge, and a flange extends radially outwardly from the axially extending ridge. This flange includes an axially facing surface disposed in facing relation to an oppositely axially-facing surface of the actuator, and a radially-facing surface disposed in facing relation to an oppositely radially-facing surface of the actuator.

An actuator shaft washer seal is disposed adjacent to the upper edge of the bearing assembly. The actuator shaft washer seal is fixed to the actuator and extends radially inwardly toward the pivot shaft.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
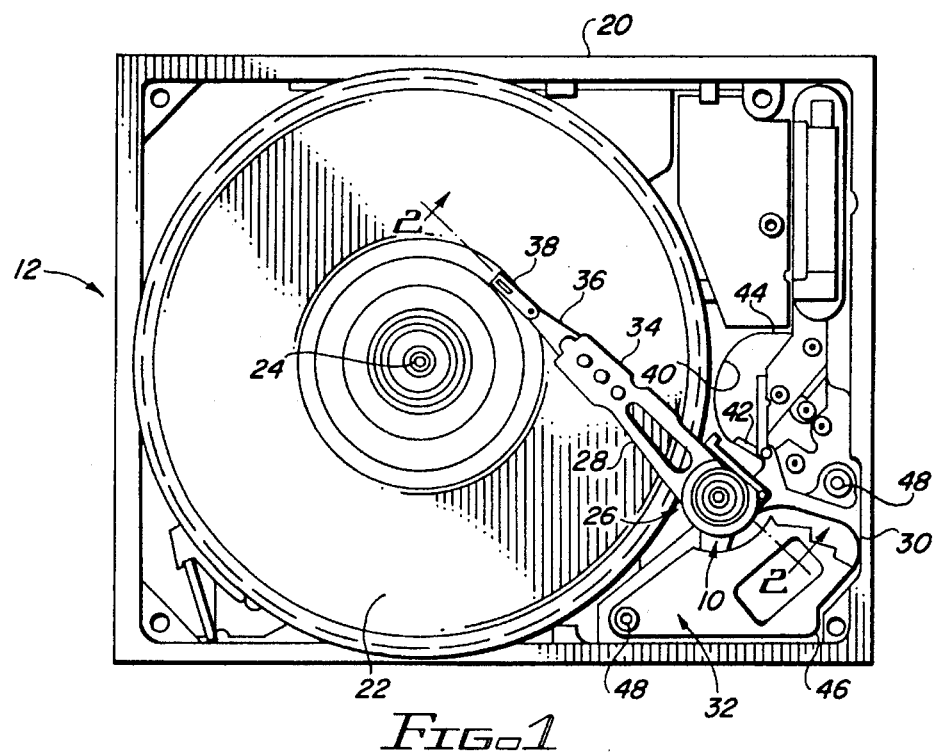
FIG. 1 is a top plan view of a hard disk drive unit, shown with the top cover removed and illustrating the operational relationship between an actuator assembly and a stack of data storage disks.

As shown in the drawings for purposes of illustration, the present invention is concerned with an improved actuator assembly, generally designated in the accompanying drawings by the reference number 10. The improved actuator assembly 10 is useful in hard disk drive systems, such as the exemplary system 12 somewhat schematically shown in FIG. 1. As will be described in detail below, the actuator assembly 10 includes a labyrinth seal 14 capable of eliminating or minimizing actuator bearing lubricant migration or out-gassing into the hard disk drive system.

As illustrated with respect to a preferred embodiment in FIG. 1, the actuator assembly 10 includes an actuator hub 16 which is pivotally mounted to a pivot shaft 18 within a housing 20 adjacent to a stack of data storage disks 22. These disks 22 are clamped onto a shaft 24 of a spindle motor (not shown), with the disks being oriented in the stack more or less uniformly spaced from one another. The spindle motor drives the stack of storage disks 22 in unison.

The actuator assembly 10 comprises, broadly, an actuator 26 including the actuator hub 16 and an arm assembly 28 which extends toward the stack of storage disks 22. A coil assembly 30 is fixed to the actuator hub 16 opposite the arm assembly 28, and interacts with a magnet assembly 32 to form a precision moving coil, limited rotation D.C. motor which angularly displaces the actuator 26 about the pivot shaft 18. The arm assembly 28 includes a plurality of head carriers 34 which each support a head assembly 36. These head assemblies, in turn, support electromagnetic heads 38 which are capable of reading and writing data on the respective storage disks 22 as the heads traverse the disks in response to movement of the actuator assembly 10.

A data cable 40 extends from the electromagnetic heads 38 along the respective head assemblies 36 to the arm assembly 28. The data cable 40 is supported by a flexible cable clamp 42 which accommodates the limited movement of the cable 40 as the actuator assembly 10 is pivoted. The cable 40 extends from the flexible cable clamp 42 within the housing 20 to a rigid cable clamp 44, and from there to an appropriate connection (not shown) for connecting the hard disk drive system 12 to appropriate computer hardware.

The magnet assembly 32 interacts with the coil assembly 30 to control the positioning of the electromagnetic heads 38 with respect to the disks 22. The magnet assembly 32 includes a plurality of upper and lower magnets (not shown) spaced from one another so that the coil assembly 30 is permitted to extend therebetween. The magnets are positioned within a magnet housing 46, which is secured to the housing 20 by mounting bolts 48.

Figure 2:
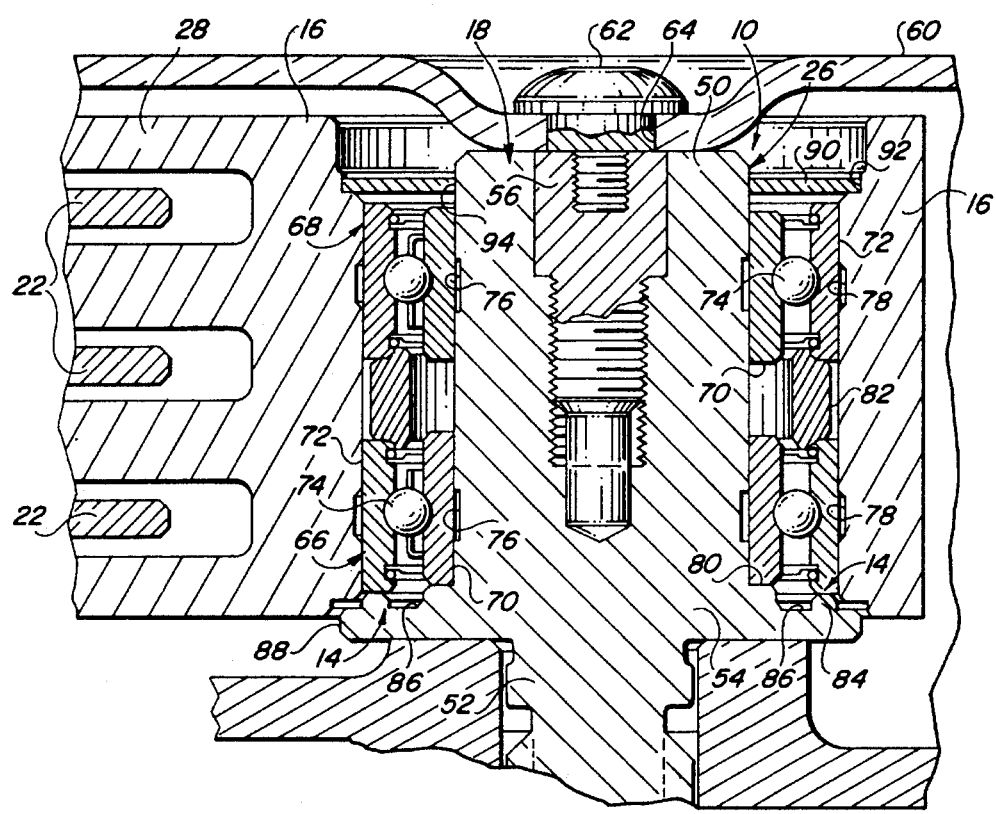
FIG. 2 is an enlarged fragmented elevational section taken generally along the line 2—2 of FIG. 1, illustrating a labyrinth seal incorporated into an E-block of the pivot shaft and disposed adjacent to a lower edge of a lower bearing.

With reference to FIG. 2, the pivot shaft 18 includes an upper, generally cylindrical portion, a lower base 52 which is secured to a portion of the housing 20, and an intermediate E-block portion 54. A line through the center of the pivot shaft 18 defines a pivot axis for the actuator assembly 10. Along this pivot axis and within the upper portion 50 of the pivot shaft 18, is situated a plug 56 having an upper threaded recess 58. When a housing cover 60 is placed over the housing 20 to enclose the various components of the hard disk drive system 12, a cover screw 62 is placed so as to extend through an aperture 64 through the housing cover 60, and secured within the upper threaded recess 58 of the plug 56.

A pair of double shielded bearings 66 and 68 are disposed between the actuator hub 16 and the upper portion 50 of the pivot shaft 18. Each bearing includes an inner race 70 fixed relative to the pivot shaft 18, an outer race 72 fixed relative to the actuator hub 16, and a plurality of ball bearings 74. Both the pivot shaft 18 and the actuator hub 16 include encircling grooves 76 and 78 which permit an adhesive to be injected therein to secure the bearings 66 and 68 to the pivot shaft and the actuator 26.

The lower bearing 66 encircles the upper portion 50 of the pivot shaft 18, and the inner race 70 thereof is supported upon an upward or axially facing shoulder 80 of the E-block 54. A circular bearing spacer 82 is utilized to precisely position the upper bearing 68 relative to the lower bearing 66, and is designed to extend between the outer races 72 of each bearing. This particular configuration precisely positions both the upper and lower bearings 68 and 66 relative to the pivot shaft 18.

In accordance with the present invention, seals are provided adjacent to the upper and lower bearings 68 and 66 in order to eliminate or minimize actuator bearing lubricant migration and out-gassing from the bearings into the remainder of the hard disk drive system. In this regard, the labyrinth seal 14 is provided adjacent to a lower edge of the lower bearing 66. The labyrinth seal is incorporated into the E-block 64 portion of the pivot shaft 18, and includes an axially extending ridge 84 which is disposed in facing relation to a downwardly facing surface of the outer race 72 of the lower bearing 66. The opposed faces of the axially extending ridge 84 and the outer race 72 of the bearing 66 are separated by an air gap of between 0.003 and 0.005 inch.

A reservoir 86 is disposed radially inwardly of the axially extending ridge 84, and a flange 88 extends radially outwardly of the axially extending ridge. The flange 88 includes an axially facing surface disposed in facing relation to an oppositely axially-facing surface of the actuator 26, and a radially-facing surface disposed in facing relation to an oppositely radially-facing surface of the actuator. The gap between the facing surfaces between the labyrinth seal 14 and the actuator 26 are preferably between 0.003 and 0.010 inch. The design of a long narrow stepped pass with very close fit dimensions and tight tolerances reduces the amount of air flow from the bearing assembly, and blocks the travel of small lubricant particles between high and low pressure areas within the actuator assembly 10.

At the upper end of the bearing assembly, an actuator shaft washer seal 90 is provided. The actuator hub 16 includes an upwardly facing shoulder on which the actuator shaft washer seal is placed in press-fit relation. The washer seal 90 extends radially inwardly from the actuator hub 16 toward the pivot shaft 18.

It will be appreciated that the actuator shaft washer seal 90 has a far simpler construction than the labyrinth seal 14 because centrifugal forces developed within the actuator assembly on movement of the actuator 26 about the pivot shaft 18, tends to force any actuator bearing lubricant outwardly. Above the bearings 66 and 68, at the location of the actuator shaft washer seal 90, the air flow path into and out of the bearing assembly, which is also the potential bearing lubricant migration path, passes adjacent to the surface of the pivot shaft 18. It is, thus, very unlikely that actuator bearing lubricant will find its way through the gap 94 between the washer seal 90 and the pivot shaft 18.

At the lower end of the bearing assembly, however, the situation is quite different. At this location adjacent to the lower bearing 66, it is often desirable to provide a seal which is not a part of the actuator 26, nor connected thereto, in order to maximize manufacturing efficiencies in connection with the assembly of the hard disk drive system 12. The labyrinth seal 14 was devised with this in mind. The labyrinth seal 14 creates a labyrinth-type passageway for air flow between the bearing assembly and the remainder of the hard disk drive system 12. The reservoir 86 serves to collect actuator bearing lubricant which may have escaped from the bearings 66 and 68.

Although a particular embodiment of the invention has been described in detail for purposes of illustration, various modifications may be made without departing from the spirit and scope of the invention. Accordingly, the invention is not to be limited, except as by the appended claims.

What is claimed is:

1. An actuator assembly for a computer disk drive, comprising:

a pivot shaft fixed relative to a housing for the computer disk drive, the pivot shaft defining a pivot axis for the actuator assembly;

an actuator generally encircling at least a portion of the pivot shaft, the actuator including an arm assembly which extends toward a stack of data storage disks, and being pivotable about the pivot axis;

a bearing assembly having upper and lower edges, an inner race fixed to the pivot shaft, and an outer race fixed to the actuator; and a labyrinth seal adjacent to an edge of the bearing assembly, including an axially extending ridge disposed in facing relation to an edge of the outer race and separated therefrom by an air gap.

2. The actuator assembly of claim 1, wherein the labyrinth seal includes a reservoir disposed radially inwardly of the axially extending ridge.

3. The actuator assembly of claim 2, wherein the labyrinth seal includes a flange extending radially outwardly of the axially extending ridge, the flange including an axially-facing surface disposed in facing relating to an oppositely axially-facing surface of the actuator.

4. The actuator assembly of claim 3, wherein the labyrinth seal flange includes a radially-facing surface disposed in facing relation to an oppositely radially-facing surface of the actuator.

5. The actuator assembly of claim 2, wherein the labyrinth seal is incorporated into the pivot shaft.

6. The actuator assembly of claim 5, wherein the labyrinth seal is disposed adjacent to the lower edge of the bearing assembly.

7. The actuator assembly of claim 6, including an actuator shaft washer seal adjacent to the upper edge of the bearing assembly.

8. The actuator assembly of claim 7, wherein the actuator shaft washer seal is fixed to the actuator and extends radially inwardly toward the pivot shaft.

9. The actuator assembly of claim 6, wherein the air gap is between 0.003 and 0.005 inch.

10. The actuator assembly of claim 9, wherein the labyrinth seal includes a flange extending radially outwardly of the axially extending ridge, the flange including an axially-facing surface disposed in facing relation to an oppositely axially-facing surface of the actuator, and a radially-facing surface disposed in facing relation to an oppositely radially-facing surface of the actuator.

11. An actuator assembly for a computer disk drive, comprising:

a pivot shaft fixed relative to a housing for the computer disk drive, the pivot shaft defining a pivot axis for the actuator assembly;

an actuator generally encircling at least a portion of the pivot shaft, the actuator including an arm assembly which extends toward a stack of data storage disks, and being pivotable about the pivot axis;

a bearing assembly disposed between the pivot shaft and the actuator, the bearing assembly including upper and lower shielded bearings defining, respectively, upper and lower edges of the bearing assembly, each of the bearings including an inner race fixed to the pivot shaft, and an outer race fixed to the actuator; and a labyrinth seal incorporated into the pivot shaft and disposed adjacent to the lower edge of the bearing assembly, including an axially extending ridge disposed in facing relation to an edge of the outer race and separated therefrom by an air gap.

12. The actuator assembly of claim 11, wherein the labyrinth seal includes a reservoir disposed radially inwardly of the axially extending ridge.

13. The actuator assembly of claim 12, wherein the labyrinth seal includes a flange standing radially outwardly of the axially extending ridge, the flange including an axially-facing surface disposed in facing relating to an oppositely axially-facing surface of the actuator.

14. The actuator assembly of claim 13, wherein the labyrinth seal flange includes a radially-facing surface disposed in facing relation to an oppositely radially-facing surface of the actuator.

15. The actuator assembly of claim 14, including an actuator shaft washer seal adjacent to the upper edge of the bearing assembly.

16. The actuator assembly of claim 15, wherein the actuator shaft washer seal is fixed to the actuator and extends radially inwardly toward the pivot shaft.

17. An actuator assembly for a computer disk drive, comprising:

a pivot shaft fixed relative to a housing for the computer disk drive, the pivot shaft defining a pivot axis for the actuator assembly;

an actuator generally encircling at least a portion of the pivot shaft, the actuator including an arm assembly which extends toward a stack of data storage disks, and being pivotable about the pivot axis;

a bearing assembly disposed between the pivot shaft and the actuator, the bearing assembly including upper and lower shielded bearings defining, respectively, upper and lower edges of the bearing assembly, each of the bearings including an inner race fixed to the pivot shaft, and an outer race fixed to the actuator;

a labyrinth seal incorporated into the pivot shaft and disposed adjacent to the lower edge of the bearing assembly, the labyrinth seal including an axially extending ridge disposed in facing relation to an edge of the outer race and separated therefrom by an air gap between 0.003 and 0.005 inch, a reservoir disposed radially inwardly of the axially extending ridge, and a flange extending radially outwardly of the axially extending ridge, the flange including an axially facing surface disposed in facing relation to an oppositely axially-facing surface of the actuator, and a radially-facing surface disposed in facing relation to an oppositely radially-facing surface of the actuator; and an actuator shaft washer seal adjacent to the upper edge of the bearing assembly, the actuator shaft washer seal being fixed to the actuator and extending radially inwardly toward the pivot shaft.

* * * * *